(12) United States Patent
Tsirkin

(10) Patent No.: US 11,809,888 B2
(45) Date of Patent: Nov. 7, 2023

(54) VIRTUAL MACHINE MEMORY MIGRATION FACILITATED BY PERSISTENT MEMORY DEVICES

(71) Applicant: RED HAT, INC., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 335 days.

(21) Appl. No.: 16/398,036

(22) Filed: Apr. 29, 2019

(65) Prior Publication Data

US 2020/0341797 A1    Oct. 29, 2020

(51) Int. Cl.
G06F 9/455      (2018.01)
G06F 15/173     (2006.01)
G06F 3/06       (2006.01)

(52) U.S. Cl.
CPC ........ *G06F 9/45558* (2013.01); *G06F 3/0604* (2013.01); *G06F 3/067* (2013.01); *G06F 3/0647* (2013.01); *G06F 3/0664* (2013.01); *G06F 15/17331* (2013.01); *G06F 2009/4557* (2013.01); *G06F 2009/45575* (2013.01); *G06F 2009/45583* (2013.01)

(58) Field of Classification Search
CPC .. G06F 9/45558; G06F 3/0604; G06F 3/0647; G06F 3/0664; G06F 3/067; G06F 15/17331; G06F 2009/4557; G06F 2009/45575; G06F 2009/45583
See application file for complete search history.

(56) References Cited

U.S. PATENT DOCUMENTS

| | | | |
|---|---|---|---|
| 6,026,474 A * | 2/2000 | Carter | G06F 16/9574 711/E12.066 |
| 7,130,951 B1 | 10/2006 | Christie et al. | |
| 7,707,341 B1 | 4/2010 | Klaiber et al. | |
| 7,868,897 B2 | 1/2011 | Vembu et al. | |
| 8,250,586 B2 | 8/2012 | Nelson | |
| 8,266,620 B2 | 9/2012 | Kissell | |
| 8,516,479 B2 | 8/2013 | Hattori et al. | |
| 8,832,390 B1 | 9/2014 | Ahmad et al. | |

(Continued)

FOREIGN PATENT DOCUMENTS

CN       100570587 C     12/2009

OTHER PUBLICATIONS

Oracle prime "Oracle Enterprise Manager For Oracle Construction and Engineering configuration Guide for On Premises" Version 17, Oct. 2027, pp. 1-18. (Year: 2017).*

(Continued)

*Primary Examiner* — Meng Ai T An
*Assistant Examiner* — Willy W Huaracha
(74) *Attorney, Agent, or Firm* — Lowenstein Sandler LLP

(57) ABSTRACT

A method includes receiving a request to migrate a virtual machine from a source host to a destination host, mapping, by a hypervisor running on the source host, a first portion of a memory of the virtual machine to a persistent memory device, where the persistent memory device is accessible by the source host machine and the destination host machine, responsive to determining that a time period to execute a synchronization operation with respect to the first portion of the memory by the persistent memory device is below a threshold, stopping the virtual machine on the source host, and starting the virtual machine on the destination host.

17 Claims, 6 Drawing Sheets

(56) References Cited

U.S. PATENT DOCUMENTS

| | | |
|---|---|---|
| 8,843,910 B1 | 9/2014 | Schwerin et al. |
| 8,880,764 B2 | 11/2014 | Tsirkin et al. |
| 9,116,633 B2 | 8/2015 | Sancheti et al. |
| 9,201,612 B1 | 12/2015 | Vincent |
| 9,201,679 B2* | 12/2015 | Tsirkin ................ G06F 9/45558 |
| 9,367,453 B1 | 6/2016 | Clark et al. |
| 9,384,035 B2 | 7/2016 | Ito et al. |
| 9,405,642 B2 | 8/2016 | Tsirkin |
| 10,635,997 B1 | 4/2020 | Roth et al. |
| 10,963,286 B2* | 3/2021 | Xie ..................... G06F 9/45533 |
| 2002/0174165 A1 | 11/2002 | Kawaguchi |
| 2004/0015969 A1 | 1/2004 | Chang |
| 2006/0195683 A1 | 8/2006 | Kissell |
| 2006/0218328 A1 | 9/2006 | Vega et al. |
| 2007/0208849 A1* | 9/2007 | Ely ..................... G06F 11/3495 |
| | | 709/224 |
| 2008/0127182 A1 | 5/2008 | Newport et al. |
| 2008/0163239 A1 | 7/2008 | Sugumar et al. |
| 2008/0270564 A1 | 10/2008 | Rangegowda et al. |
| 2010/0186011 A1 | 7/2010 | Magenheimer |
| 2011/0047310 A1 | 2/2011 | Bonola |
| 2011/0161541 A1 | 6/2011 | Madukkarumukumana et al. |
| 2011/0197039 A1 | 8/2011 | Green et al. |
| 2011/0264788 A1 | 10/2011 | Costa |
| 2011/0302577 A1 | 12/2011 | Reuther et al. |
| 2011/0320556 A1 | 12/2011 | Reuther |
| 2012/0017031 A1 | 1/2012 | Mashtizadeh et al. |
| 2012/0054367 A1 | 3/2012 | Ramakrishnan et al. |
| 2012/0110237 A1 | 5/2012 | Li et al. |
| 2012/0204183 A1 | 8/2012 | Bayer et al. |
| 2013/0014103 A1 | 1/2013 | Reuther et al. |
| 2013/0054860 A1 | 2/2013 | Tsirkin et al. |
| 2013/0074065 A1 | 3/2013 | McNeeney et al. |
| 2013/0097369 A1 | 4/2013 | Talagala et al. |
| 2013/0117744 A1 | 5/2013 | Klein et al. |
| 2013/0185420 A1 | 7/2013 | Shimogawa |
| 2013/0198312 A1* | 8/2013 | Tamir ..................... G06F 21/44 |
| | | 709/212 |
| 2013/0326174 A1* | 12/2013 | Tsirkin .................... G06F 12/08 |
| | | 711/162 |
| 2013/0346613 A1 | 12/2013 | Tarasuk-Levin et al. |
| 2014/0025890 A1 | 1/2014 | Bert et al. |
| 2014/0033201 A1 | 1/2014 | Dawkins et al. |
| 2014/0059539 A1 | 2/2014 | Simonsen |
| 2014/0115162 A1 | 4/2014 | Kalyanaraman et al. |
| 2014/0173213 A1 | 6/2014 | Beveridge |
| 2014/0215172 A1 | 7/2014 | Tsirkin |
| 2014/0215459 A1* | 7/2014 | Tsirkin ................ G06F 9/45558 |
| | | 718/1 |
| 2015/0277974 A1 | 10/2015 | Beale |
| 2017/0315839 A1* | 11/2017 | Zhang ..................... G06F 9/455 |
| 2018/0107605 A1* | 4/2018 | Dong ................. G06F 9/45558 |
| 2019/0258502 A1* | 8/2019 | Sanjeepan ............... G06F 9/442 |
| 2019/0310881 A1* | 10/2019 | Gupta ................. G06F 9/45533 |
| 2019/0332411 A1* | 10/2019 | Leitao ................... G06F 9/4418 |
| 2022/0019551 A1* | 1/2022 | Baba ...................... G06F 12/06 |

OTHER PUBLICATIONS

U.S. Appl. No. 13/753,156, Non Final Office Action dated Apr. 22, 2015.
U.S. Appl. No. 13/753,156, Final Office Action dated Sep. 4, 2015.
U.S. Appl. No. 13/753,156, Non Final Office Action dated Dec. 3, 2015.
U.S. Appl. No. 13/753,156, Final Office Action dated Apr. 4, 2016.
U.S. Appl. No. 13/753,285, Non Final Office Action dated Sep. 1, 2015.
U.S. Appl. No. 13/753,285, Non Final Office Action dated Jan. 6, 2015.
U.S. Appl. No. 13/753,285, Final Office Action dated Apr. 20, 2015.
U.S. Appl. No. 13/753,285, Advisory Action dated Jul. 8, 2015.
U.S. Appl. No. 13/753,285, Final Office Action dated Dec. 9, 2015.
U.S. Appl. No. 13/753,285, Advisory Action dated Feb. 23, 2016.
U.S. Appl. No. 13/753,285, Notice of Allowance dated Apr. 1, 2016.
Feiner, P., "Exogenous Memory Management via-Mem-Path," Downloaded from http://lists.gnu.org/archive/html/qemu-devel/2012-11/msg02024.html. 4 pages.
Lin, "Virtual Memory" 2003, http://www.cs.umd.edu/.
"Intel 64 and IA-32 Architectures Software Developer's Manual", Intel Corporation, Chapters 23-29, Sep. 2014, 136 pages http://www.intel.in/content/dam/www/public/us/en/documents/manuals/64-ia-32-architectures-software-developer-vol-3c-part-3-manual.pdf.
Canet, Benoit, "[Qemu-devel] APIC-V and QEMU Block IO Performance", Mar. 1, 2013, 3 pages https://lists.gnu.org/archive/html/qemu-devel/2013-03/msg00075.html.
Humbel, Lukas, "Multicore Virtualization Over A Multikernel", Master's Thesis Nr. 83, ETH, Zurich, May 5, 2013, 50 pages http://www.barrelfish.org/ma-humbell-final.pdf.

* cited by examiner

VIRTUAL MACHINE MEMORY MIGRATION FACILITATED BY PERSISTENT MEMORY DEVICES

TECHNICAL FIELD

Embodiments of the present disclosure relate to a computer system, and more specifically, to a method for migrating a virtual machine memory facilitated by persistent memory.

BACKGROUND

A virtual machine (VM) is a portion of software that, when executed on hardware of a host computer system (referred to as "host" or "host machine"), creates an environment allowing for an abstraction of some physical components of the host computer system in order to allow running of various modules, for example, multiple operating systems, concurrently and in isolation from other modules. Virtualization permits, for example, consolidating multiple physical servers into one physical server running multiple VMs in order to enhance the hardware utilization rate. The host allocates a certain amount of its resources to each VM. Each VM can then use the allocated resources to execute applications, including operating systems (guest operating systems (OS)). A software layer providing the virtualization may be referred to as a hypervisor, a virtual machine monitor (VMM), or a kernel-based hypervisor, to name a few examples. The hypervisor emulates the underlying hardware of the host computer system, making the use of the VM transparent to the guest OS and the user of the VM. A VM may have a virtual processor, virtual system memory, virtual storage, and various virtual devices. VMs may be migrated between a source host computing platform ("the source host") and a destination host computing platform ("the destination host") connected over a network, which may be a local-area network (LAN) or a wide-area network (WAN) that may include the Internet.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
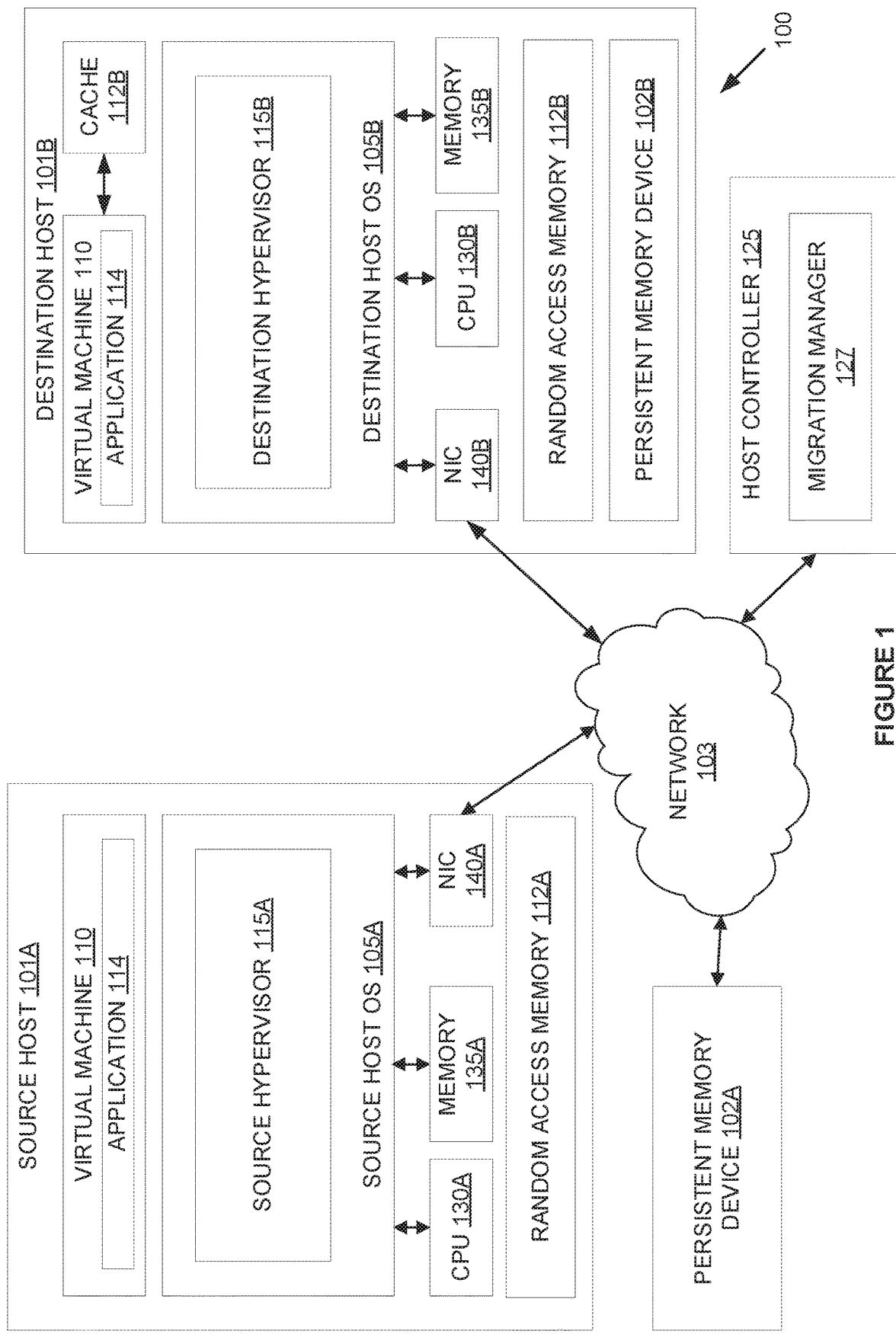
FIG. 1 depicts a high-level diagram that illustrates a source host computer system, a persistent memory device, a host controller, and a destination host computer system, in accordance with one or more aspects of the present disclosure.

Described herein are methods and systems for live migration of a virtual machine (VM) using persistent memory (PMEM) devices. One approach for migration of a VM from a source host machine (source host) to a destination host machine (destination host) over a network is to permit a VM running on the source host to continue to run during the migration process, which is referred to as live migration. Live migration typically permits a running VM to be moved between different physical machines transparently for application programs running on the VM and for their respective clients. For successful live migration, VM memory and network connectivity should be migrated from the source host to the destination host.

During live migration, the hypervisor may copy the VM memory pages from the source host to the destination host over a network while the VM is still running on the source host. While the memory pages are being copied during live migration, pages that have already been copied to the destination host may be re-written ("dirtied") by applications currently executing on the VM, which, at that time, are still running on the source host. The dirtied memory pages may be re-copied to the destination until the page-dirtying rate is less than the rate of re-copying the memory pages. In order to identify the memory pages that have been dirtied and therefore need to be re-copied to the destination host, the hypervisor may track the memory write requests with respect to the VM memory pages by write protecting the memory pages (e.g., by setting a flag in a page table entry corresponding to a memory page to be write-protected) on the source host. When a guest application attempts to write to a write-protected memory page, an ensuing page fault would cause a VM exit (i.e., a hardware event yielding the execution control to the hypervisor). Consecutively, the hypervisor may allow the memory page to be modified while recording an identifier (e.g., an address) of the memory page to a write request data structure, such as a list or a table. However, write-protecting multiple memory pages would result in large number of computationally expensive VM exits due to the inevitable page faults, thus adversely affecting the overall efficiency of the live migration process.

Implementations of this disclosure increase the speed and efficiency of the VM live migration process by utilizing PMEM devices to facilitate the live migration. Synchronization operations (e.g., commands to synchronize volatile VM memory buffers with non-volatile storage) and RDMA operations (e.g., commands to direct data movement between the memories of two machines without involving various processing components typically involved in memory transfer operations) are supported without requiring a modification of the VM or VM application workload because the mapping of the synchronization operations to the RDMA operations is performed by a hypervisor, and is performed transparently to the VM and any applications executing on the VM.

Upon receiving a request to migrate a VM from the source host to a destination host, the source hypervisor may map at least a portion of the VM memory to a PMEM device which is accessible over the network by both the source and destination hosts. A portion of VM memory that is not mapped to the PMEM device may be mapped to a random-access memory (RAM) device on the source host. The source hypervisor may then periodically issue synchronization commands to force the PMEM device to synchronize any volatile buffers with a non-volatile storage. The synchronization command may be received by an RDMA adapter where the synchronization command may be translated to an RDMA flush command (e.g., a command to flush the contents of VM memory without involving various components typically involved in memory flushing operations). The source hypervisor may measure the amount of time to synchronize the VM memory to the PMEM device after the RDMA flush command is executed on the source host. Once the source hypervisor determines that the time to synchronize the VM memory to the PMEM device is below a synchronization completion time threshold, the source hypervisor may stop the VM from running on the source host. The VM may be started on the destination host and any VM memory pages that were mapped to host RAM on the source host and were modified by a VM application after the request to migrate the VM was received may be copied to host RAM on the destination host.

Implementations of this disclosure overcome the noted drawbacks of conventional virtualization systems by utilizing a PMEM device to facilitate live migration between a source host and a destination host. By mapping at least a portion of the VM memory to the PMEM device, a large number of VM memory pages may not be copied from the source host to the destination host. In addition, because the hypervisor, and not the VM or the VM application, associates the synchronization operations with the RDMA operations, the translation process is transparent to the VM. Reducing the amount of memory pages to be copied from a source host to a destination host during a VM live migration enhances the chances for a fast and successful completion of the VM live migration. A smoother experience (e.g., less downtime of the VM) is also provided to a user of the VM while the live migration process occurs. Furthermore, implementations of the disclosure provide a technical advantage by reducing processing resources, processing time, and network bandwidth utilized to perform a live migration of a VM.

FIG. 1 depicts a high-level component diagram of one illustrative example of a virtualization architecture 100 operating in accordance with one or more aspects of the present disclosure. Virtualization architecture 100 may include a source host computer system (source host) 101*a*, one or more persistent memory (PMEM) devices 102 (e.g., 102*a*, 102*b*), a destination host computer system (destination host) 101*b*, and a host controller 125. Source host 101*a*, PMEM devices 102, destination host 101*b*, and host controller 125 may be communicably connected over a network 103. Network 103 may be a private network (e.g., a local area network (LAN), a wide area network (WAN), intranet, etc.), a public network (e.g., the Internet)), a wireless network (e.g., an 802.11 network or a wireless fidelity (Wi-Fi) network), a cellular network (e.g., a Long Term Evolution (LTE) network), routers, hubs, switches, server computers, and/or a combination thereof.

Source host 101*a* and destination host 101*b* (collectively referred to as "host 101") may be a server, a rackmount server, a router computer, a server computer, a mainframe computer, a workstation, a personal computer (PC), a mobile phone, a smart phone, a mobile computing device, a personal digital assistant (PDA), tablet, laptop computer, thin client, etc. Source host 101*a* and destination host 101*b* may include one or more physical central processing units (CPUs) 130*a*, 130*b* (referred to herein as "processors" or "processing devices") (collectively referred to as "CPU 130") communicatively coupled to a memory device 135*a*, 135*b* (collectively referred to as "memory 135"), and a network interface controller (NIC), 140*a*, 140*b* (collectively referred to as "NIC 140"). Local components within host 101, including connections between CPU 130, memory device 135, and NIC 140, may be provided by one or more local buses (not shown) of a suitable architecture.

"CPU," "processor," or "processing device" herein shall refer to a device capable of executing instructions encoding arithmetic, logical, or I/O operations. In an illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor, which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket).

"Memory device" herein shall refer to a volatile or non-volatile memory device, such as random access memory (RAM), read only memory (ROM), electrically erasable programmable read-only memory (EEPROM), or any other device capable of storing data. "Network interface controller" herein shall refer to a device capable of implementing a physical layer and data link layer standard (such as Ethernet or InfiniBand).

In one implementation, source host 101*a*, destination host 101*b*, PMEM device 102, and host controller 125 may be part of a virtualization system. Host 101 may run one or more virtual machines (VMs) 110. Host 101 may also run an operating system 105 (host OS) to manage resources of host 101 made available to VM 110. Host OS 105 may manage and monitor various aspects of the operation of host 101, including storage, memory, and network interfaces. In some embodiments, source host OS 105*a* and destination host OS 105*b* may include a source hypervisor 115*a* and destination hypervisor 115*b* (collectively referred to as "hypervisor 115"). Hypervisor 115 may virtualize access to the underlying host hardware components (e.g., CPU 130, memory 135, NIC 140), making the use of VM 110 transparent to the guest OS running on VM 110 and to users (e.g., a system administrator) of host 101. Hypervisor 115 may abstract the physical layer (i.e., hardware components) of the host machine (e.g., CPU 130, memory 135, NIC 140), and present this abstraction to VM 110 as a virtual device. Device virtualization may be implemented by intercepting VM memory read/write and/or input/output (I/O) operations with respect to certain memory and/or I/O port ranges, and by routing hardware interrupts to a VM 110 associated with the corresponding virtual device. Hypervisor 115 may provide interfaces between the underlying hardware and virtual devices of VMs 110. VM 110 may execute a guest OS (not shown), which may utilize underlying virtual processors (virtual central processing units (vCPUs)), virtual memory, and virtual I/O devices. One or more applications may be executing on VM 110 through the guest OS.

PMEM device 102 may be accessible by source host 101*a* and destination host 101*b*. A PMEM device may include any solid-state memory device with byte-addressable, load/store memory access, but with the persistence properties of storage devices (e.g., a NVDIMM device). PMEM devices generally reside on the memory bus, allowing the PMEM device to have dynamic random-access memory (DRAM)-like access to data. As a result, the PMEM device has nearly the same speed and latency of DRAM, but has the persistence properties of non-volatile memory storage devices. In one embodiment, PMEM device 102 may be a network-attached PMEM device (e.g., PMEM device 102a). In another embodiment, PMEM device 102 may be a co-located PMEM device (e.g., PMEM device 102b) which is a peripheral device of source host 101a (not shown) or destination host 101b.

Application 114 may include a guest OS, a user application, etc. In such implementations, PMEM device 102 may be exposed to the VM and/or application 114 as a random-access memory (RAM) storage device 112a (e.g., DRAM, static RAM (SRAM), etc.) located on source host 101a. Source host OS 105a and/or source hypervisor 115a may map memory pages of memory 135a to PMEM device 102 (i.e., via guest page tables). The memory mapping to PMEM device 102 may be transparent to VM 110 executing on source host 101a, and therefore, PMEM device 102 may be exposed to VM 110 as host RAM 112a. Source hypervisor 115a may receive memory access requests (e.g., read or write requests) from VM 110, and source hypervisor 115a may utilize the memory page mapping of VM memory 135a so to facilitate interaction between VM 110 and PMEM device 102.

In one embodiment, source host 101a and destination host 101b may be communicably coupled to a host controller 125 via network 103. Host controller 125 may be one or more computing devices (e.g., a rackmount server, a router computer, a server computer, a personal computer, a mainframe computer, a laptop computer, a table computer, a desktop computer, etc.), data stores (e.g., hard disks, memories, databases, etc.), networks, software components, and/or hardware components. Host controller 125 may reside on designated computer device(s), or be part of source host 101a or source host 101b, or another machine.

Virtualization architecture 100 may support remote direct memory access (RDMA) operations. RDMA operations may allow source host 101a and destination host 101b to exchange data in memories 135a, 135b without involving CPU 130, host OS 105, or various other components typically involved in memory transfer operations. RDMA operations enable direct data movement between memories 135a, 135b by utilizing a transport protocol in an RDMA adapter. An RDMA adapter may be provided by an RDMA-enabled NIC (e.g., NIC 140) which may translate a memory access request from VM 110 executing on source host 101a to an RDMA command to be transmitted over the network to an RDMA-enabled remote host (e.g., a PMEM device). In an illustrative example, a memory read request may be translated to an RDMA read command; conversely, a memory write request may be translated to an RDMA write command. The RDMA adapter may be programmed to directly read or write the host memory (e.g., portions of memory 135 reserved for applications executing on VM 110).

As discussed previously, live migration refers to the process of moving a running VM 110 between different physical machines without disconnecting VM 110. For a successful live migration, memory 135a, and network connectivity of VM 110 may be migrated from source host 101a to destination host 101b. Hypervisor 115 may facilitate live migration of VM 110 from source host 101a to destination host 101b. Hypervisor 115 may receive migration instructions from host controller 125. Hypervisor 115 may also make decisions regarding migrations, such as when to stop VM 110 from executing on source host 101a.

Host controller 125 may include a migration manager 127 that may manage VM migration by issuing instructions to hypervisor 115. Migration manager 127 and hypervisor 115 may work together to manage migrations, including determining a destination host machine (e.g., destination host 101b), coordinating one or more PMEM devices (e.g., PMEM device 102a or PMEM device 102b), initiating and scheduling migration, detecting and managing migration failures, and so on.

Source hypervisor 115a may initiate live migration responsive to receiving a request from migration manager 127 of host controller 125 to migrate VM 110 from source host 101a to destination host 101b. In one embodiment, host controller 125 may issue the migration request responsive to a triggering event (e.g., a system administrator's migration request, system conditions, such as resource utilization by source host 101a exceeding a threshold, etc.).

Source hypervisor 115a may map at least some memory pages of VM 110 from memory 135a on source host 101a to PMEM device 102. To map a memory page of memory 135a to PMEM device 102, source hypervisor 115a may generate a page table entry that associates the memory page of memory 135a with the location of the data stored on PMEM device 102. When a memory access request is received from VM application 114, the page table may be accessed to determine the physical address of the requested data on PMEM device 102. The memory mapping may be performed at any time before or after source hypervisor 115a receives a migration request. In one embodiment, memory 135a may be mapped to PMEM device 102 on virtual machine boot (e.g., before the VM is started). In another embodiment, source hypervisor 115a may map at least a portion of memory 135a to host RAM 112a on source host 101a by the same mechanism to map a memory page of memory 135a to PMEM device 102, as discussed above. Source hypervisor 115a may generate a page table entry that associates the memory of VM 110 with host RAM 112a. By mapping at least a portion of memory 135a to host RAM 112a, at least some memory accesses may occur on source host 101a and not at PMEM device 102.

As discussed above, a portion of VM memory pages of memory 135a may be mapped to PMEM device 102 in some implementations of the present disclosure. In other implementations of the present disclosure, all VM memory pages of memory 135a may be mapped to PMEM device 102. In such implementations, the live migration process may begin with a warm-up phase. During the warm-up phase, source hypervisor 115a may periodically execute a synchronization command to synchronize the contents of memory 135a to PMEM device 102. Synchronization of memory 135a may include updating contents of memory stored on PMEM device 102 corresponding with VM memory buffers of mapped memory 135a that have been modified since the last synchronization. Source hypervisor 115a may update contents of memory stored on PMEM device 102 by flushing buffers associated with memory 135a to PMEM device 102.

In some embodiments, the synchronization command may be received by an RDMA adapter (e.g., an RDMA-enabled NIC 140) which may translate the synchronization command to an RDMA flush command. An RDMA flush command may flush (i.e., synchronize one or more contents of memory mapped to a memory storage device and/or invalidate the synchronized contents of memory) the contents of memory 135a without involving various components typically involved in memory flushing operations. For example, the RDMA flush command issued by the RDMA adapter may directly flush the contents of memory 135a to PMEM device 102 without involving CPU 130, host OS 105, and so on.

Source hypervisor 115a may measure the completion time periods of at least a subset of the issued synchronization commands. A synchronization completion metric may be computed based on the completion time of one or more synchronization commands issued. Source hypervisor 115a may use various techniques to generate the synchronization completion metric. In one embodiment, the synchronization completion metric may be represented by an average synchronization completion time period measured over a predetermined number of consecutively executed synchronization commands. In another illustrative embodiment, the synchronization completion metric may be represented by a maximum synchronization completion time period measured over a predetermined number of consecutively executed synchronization commands. Responsive to determining that the synchronization completion metric falls below a predetermined or dynamically adjustable threshold, the source hypervisor may exit the warm-up phase and enter a cold migration phase.

In certain implementations, the switch-over moment between the warm-up phase and the cold migration phase may be determined by a machine learning-based classifier, which may predict an optimal switchover moment based on measured completion times of multiple consecutive synchronization commands. The classifier may be preliminary trained on a training data set including a series of measurements completion times of multiple consecutive synchronization commands before the switchover and corresponding VM downtimes upon restarting the VM at the destination host, so that the trained classifier would yield the switchover moment that is most likely to correspond to the minimal VM downtime.

Upon switching over to the cold migration phase, source hypervisor 115a may issue a command to stop VM 110 from executing on source host 101a. Source hypervisor 115a may also execute a synchronization command to synchronize the remaining portions of memory 135a to PMEM device 102. Source hypervisor 115a and/or host controller 125 may receive a notification when the synchronization command issued after VM 110 was stopped on source host 101a has completed. When VM 110 is stopped on source host 101a, source hypervisor 115a may transmit a minimal execution state of source VM 110 (e.g., CPU, registers, a state of devices accessible to VM 110, non-pageable memory) to destination host 101b.

Responsive to stopping the VM on the source host, host controller 125 may instruct destination host 101b to start VM 110. In one embodiment, host controller 125 may instruct destination host 101b to start VM 110 after receiving a notification that the synchronization command issued after VM 110 was stopped on source host 101a (i.e., the final synchronization command of the live migration process) is complete. In such an embodiment, when application 114 attempts to access a memory page of memory 135b, a page fault may occur and memory on PMEM device 102 may be mapped to memory pages of memory 135b. Destination hypervisor 115b may map memory on PMEM device 102 to memory pages of memory 135b by the same mechanism to map a memory page of memory 135a to PMEM device 102, as discussed above. Destination hypervisor 115b may generate a page table entry that associates the VM memory stored on PMEM device 102 to a memory page of memory 135b.

In some embodiments, host controller 125 may instruct destination host 101b to start VM 110 before receiving a notification that the final synchronization operation is complete. In such an embodiment, VM 110 may be prevented from accessing any memory pages of memory 135b until the notification is received that the final synchronization operation is complete. In another embodiment, host controller 125 may instruct destination host 101b to start VM 110 before the final synchronization command is executed by source hypervisor 115a. In such an embodiment, VM 110 may be prevented from accessing any memory pages of memory 135b until the notification is received that the final synchronization operation is complete.

In one implementation, memory may be stored on PMEM device 102 solely for purpose for facilitating live migration between source host 101a and destination host 101b. In such an embodiment, memory associated with VM 110 may be copied to memory 135b. After the memory copying is complete, the VM memory may be re-mapped from the PMEM device 102 to memory 135b.

As discussed above, in some implementations of the present disclosure, not all VM memory pages of memory 135a may be mapped to PMEM device 102. In such implementations, a first portion of memory 135a may be mapped to PMEM device 102, while a second portion of memory 135a may be mapped to host RAM 112a (e.g., DRAM, SRAM, etc.).

In such implementations where a first portion of memory 135a is mapped to PMEM device 102 and a second portion of memory 135a is mapped to host RAM 112a, source hypervisor 115a may initiate live migration responsive to receiving a request from migration manager 127 of host controller 125 to migrate VM 110 from source host 101a to destination host 101b. In one embodiment, host controller 125 may issue the migration request responsive to a triggering event.

Source hypervisor 115a may identify the first portion of memory 135a that is to be mapped to PMEM device 102 and the second portion of memory 135a that is to be mapped to host RAM 112a. In some implementations, the first and second portions of memory 135a may be determined prior to source hypervisor 115a receiving the migration request. In one embodiment, the processing logic may determine the first and second portions of memory 135a. For example, a portion memory 135a that is accessed most frequently may be identified as the second portion of memory 135a to be mapped to host RAM 112a. In one embodiment, the first and second portions of memory 135a may be one or more parameters that are provided to source hypervisor 115a at the time of creation of VM 110. In some embodiments, the first and second portions of memory may change dynamically during the execution of VM 110. After determining the first and second portions of memory 135a, source hypervisor 115a may perform a mapping of the first and second portions of memory 135a to PMEM device 102 and to host RAM 112a, respectively, in accordance with embodiments previously described. In one embodiment, the first and second portions of memory 135a may be mapped to PMEM device 102 and host RAM 112a, respectively, on VM boot.

The live migration process may enter a warm-up phase after memory 135a is mapped to PMEM device 102 and host RAM 112a, respectively. With respect to the first portion of memory 135a that is mapped to PMEM device 102, the warm-up phase of live migration may be performed in accordance with previously disclosed embodiments. The second portion of memory 135a that is mapped to host RAM 112a may be performed in accordance with techniques below.

After mapping the second portion of memory 135a to the RAM storage device, the warm-up phase may begin by source hypervisor 115a copying the memory pages of the second portion of memory 135a to memory 135b of destination host 101b. The second portion of memory 135a may be copied over network 103 from memory 135a to memory 135b. VM 110 may continue to run on source host 101a while the second portion of memory 135a is copied to memory 135b. While VM 110 continues to run on source host 101, application 114 may issue a memory access request for one or more memory pages of memory 135a that have already been copied to memory 135b. For example, application 114 may issue a write request to modify one or more memory pages. Because a write operation may modify the contents of one or more memory pages of memory 135a, source hypervisor 115a may track the write requests with respect to the memory pages by write protecting the memory pages of the second portion of memory 135a (e.g., setting a flag in a page table entry corresponding to a memory page to be write-protected) prior to copying the memory pages of memory 135a to memory 135b. When a guest application attempts to write to a write-protected memory page, an ensuing page fault may cause a VM exit (i.e., a hardware event yielding the execution control to the hypervisor).

Source hypervisor 115a may record a memory page identifier for the memory page of the second portion of memory 135a subject to the write request in a write request data structure, such as a list or a table. It should be noted that, while the following description references a write request list, the references are merely examples and are not intended to limit the write request data structure to a write request list. In one example, source hypervisor 115a may record the identifier for the memory page to a write request list which may contain additional memory page identifiers of memory pages of the second portion of memory 135a that have also been subject to a write request. The record of the memory page identifier stored to the write request list may indicate to source hypervisor 115a that at least one memory page of the second portion of memory 135a has been modified and therefore, the previously copied memory page is out of date. After recording the memory page identifier to the write request list, source hypervisor 115a may allow the one or more memory pages to be modified in accordance with the write request.

After the memory pages have been copied from the second portion of memory 135a to memory 135b, source hypervisor 115a may identify one or more memory pages from the write request list in the second portion of memory 135a to re-copy to memory 135b Source hypervisor 115a may re-copy the modified memory pages from the second portion of memory 135a to memory 135b. If, while the modified memory pages are copied to memory 135b, a request to write to one or more memory pages of the second portion of memory 135a is received, source hypervisor 115a may detect that application 114 is attempting to change one or more memory pages of memory 135a and may record an identifier of the memory page that is subject to the write request to the write request list. After each page of the write request list has been copied to memory 135b, source hypervisor 115a may identify one or more memory pages subsequently recorded to the write request list to be copied to memory 135b. The above described process may be repeated iteratively until the write request list does not include any memory pages identifiers, or the time to copy one or more memory pages falls below a memory page copy time period threshold, as described in further detail below.

A memory page copy metric may be computed based on the completion time to copy one or more memory pages of the second portion of memory 135a to memory 135b. Source hypervisor 115a may use various techniques to generate the memory page copy metric. In one embodiment, the memory page copy metric may be represented by an average memory page copy time period measured over a predetermined number of consecutively copied memory pages that were copied from memory 135a to memory 135b. In another illustrative embodiment, the memory page copy metric may be represented by a maximum memory copy time period measured over a predetermined number of consecutively copied memory pages. Responsive to determining that the memory page copy metric falls below a predetermined or dynamically adjustable threshold, source hypervisor 115a may exit the warm-up phase and enter a cold migration phase.

In certain implementations, the switch-over moment between the warm-up phase and the cold migration phase may be determined by a machine learning-based classifier, which may predict the optimal switch-over moment based on measured completion times to copy multiple memory pages from memory 135a to memory 135b. The classifier may be preliminarily trained on a training data set including a series of measured completion times to copy multiple memory pages before the switch-over and corresponding VM downtimes upon restarting the VM at the destination host.

In one embodiment, source hypervisor 115a may determine to exit the warm-up phase and enter the cold migration phase by considering the synchronization completion metric generated during the warm-up phase of the live migration of the first portion of memory 135a mapped to PMEM device 102, and the memory page copy metric generated during the warm-up phase of the live migration of the second portion of memory 135a mapped to host RAM 112a. When the combination of these two metrics is below an overall migration time threshold, the live migration process may exit the warm-up phases described previously and enter a single cold migration phase. During the cold migration phase, source hypervisor 115a may issue a command to stop VM 110 from running on source host 101a. The remaining modified memory pages indicated on the write request list may be copied from the second portion of memory 135a to memory 135b. Source hypervisor 115a may execute a synchronization command to synchronize the remaining contents of the first portion of memory 135a. Source hypervisor 115a and/or host controller 125 may receive a notification that the memory page copying operation and the synchronization operation are complete. Source hypervisor 115a may also transmit a minimal execution state of source VM 110 (e.g., CPU, registers, a state of devices accessible to VM 110, non-pageable memory) to destination host 101b. Host controller 125 may instruct destination host 101b to start VM 110. Memory stored on PMEM device 102 may be mapped and/or copied to memory 135b in accordance with previously described embodiments.

The "source" and "destination" designations for the hosts and hypervisors are provided for reference purposes in illustrating example implementations of the live migration process according to embodiments. It will be further appreciated that, depending on the particulars of a given live migration event, a host, hypervisor, etc. may, at one time, serve as the source host, hypervisor, etc., while, at another time, serve as the destination host, hypervisor, etc.

Figure 2:
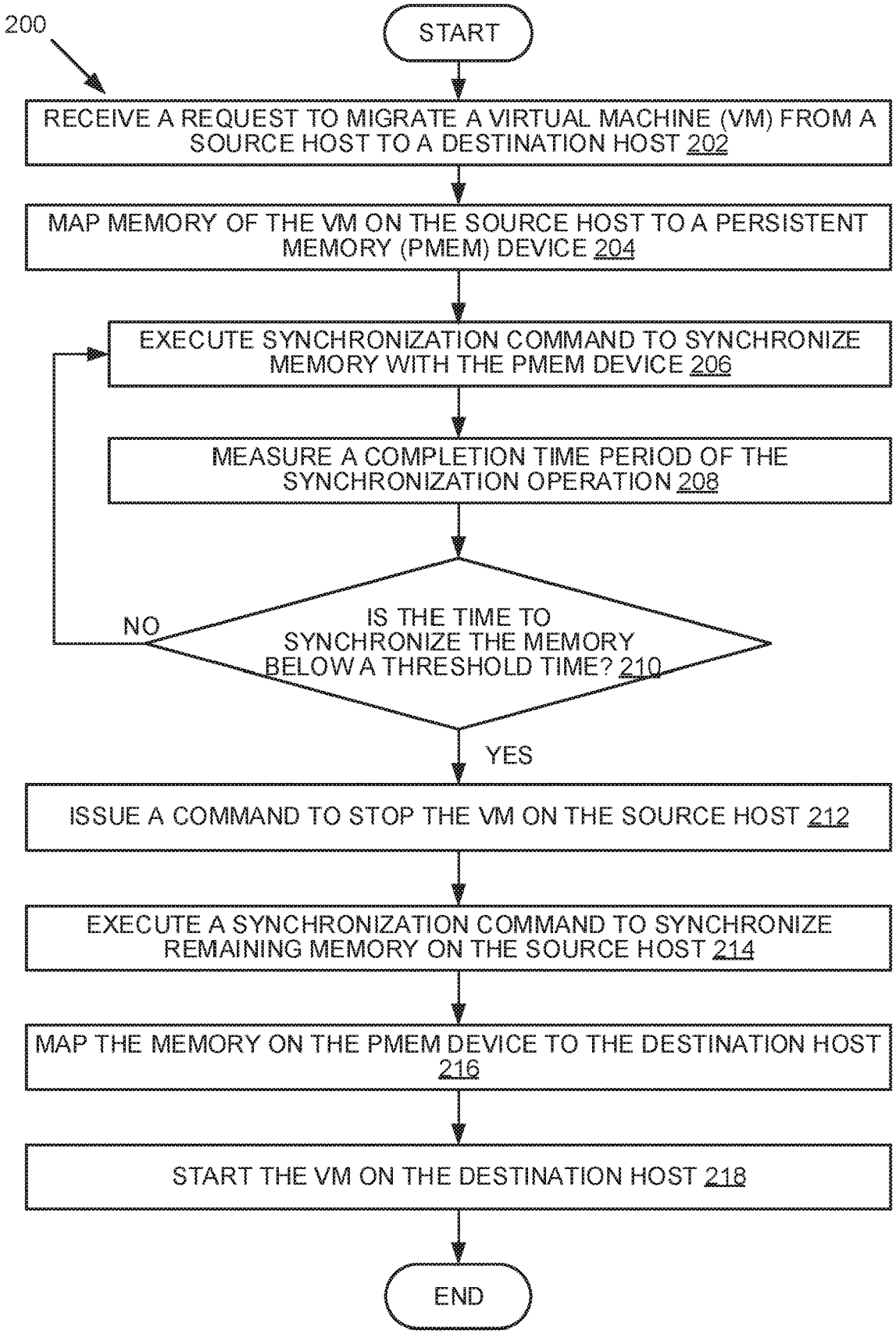
FIG. 2 depicts a flow diagram of a method executed by a host module (e.g., a hypervisor) for live migration of a virtual machine (VM) from a source host to a destination host in accordance with one or more aspects of the present disclosure.

FIG. 2 depicts a flow diagram of a method 200 for live migration of a virtual machine from a source host to a destination host in accordance with one or more aspects of the present disclosure. Although method 200 is described in terms of live migration of a VM (e.g., VM 110 of FIG. 1) residing on the source host (e.g., source host 101a) to a destination host (e.g., destination host 101b) using a PMEM device (e.g., PMEM device 102a or PMEM device 102b), method 200 of FIG. 2 may be applied to migration of a virtual machine between any two hosts (101a-101n) over a network (e.g., network 103) or residing on the same host machine (e.g., source host 101a). Method 200 may be performed by processing logic (e.g., in computer system 600 of FIG. 6) that may comprise hardware (e.g., circuitry, dedicated logic, programmable logic, microcode, etc.), software (such as instructions run on a processing device), firmware, or a combination thereof. In one embodiment, method 200 is performed primarily by a source hypervisor (e.g., source hypervisor 115a) residing on the source host.

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 2, in one embodiment, method 200 beings when, at block 202, a source hypervisor on a source host may initiate live migration responsive to receiving a request to migrate a virtual machine from the source host to a destination host. The request may be received from a host controller that directs virtual machine migrations between host machines. The host controller may issue the request responsive to a triggering event (e.g., a system administrator's migration request, a system condition such as resource utilization of the source host raising above a threshold, etc.).

At block 204, the source hypervisor may map at least some memory pages of the VM memory on the source host to the PMEM device. In one embodiment, the source hypervisor may map the memory pages in response to the migration request. In another embodiment, the memory may be mapped at VM boot (e.g., before the VM is started). In another embodiment, memory may be mapped after VM boot and before the migration request is received. The PMEM device may be accessible by both the source host and a destination host. In one embodiment, the PMEM device may be a network-attached PMEM device (e.g., PMEM device 102a of FIG. 1). In another embodiment, the PMEM device may be included as part of the source host or as part of the destination host (e.g., PMEM device 102b of FIG. 1).

At block 206, the live migration process may enter into a warm-up phase. During the warm-up phase, the source hypervisor may execute a synchronization command to synchronize the contents of VM memory with the PMEM device. The source hypervisor may use various techniques, such as machine learning, to determine when to execute the synchronization operation. In one embodiment, the synchronization command may be received by a RDMA adapter (e.g., RDMA-enabled NIC 140 of FIG. 1). The RDMA adapter may translate the synchronization command issued by the source hypervisor to an RDMA flush command.

At block 208, the source hypervisor may measure the completion time periods of at least a subset of the issued synchronization commands. A synchronization completion metric may be computed based on the completion time of one or more synchronization commands executed by the source hypervisor. The source hypervisor may use various techniques to generate the synchronization completion metric. In one embodiment, the synchronization completion metric may be represented by an average synchronization completion time period measured over a predetermined number of consecutively executed synchronization commands. In another embodiment, the synchronization completion metric may be represented by a maximum synchronization completion time period measured over a predetermined number of consecutively executed synchronization commands.

At block 210, the source hypervisor may determine the synchronization completion metric is below a predetermined or dynamically adjustable threshold, before transitioning to the next stage of the migration (i.e., stopping the VM on the source host and restarting the VM on the destination host). If the time to synchronize the contents of the memory is below the threshold, method 200 may continue to block 212. If the time to synchronize and/or flush the contents of the memory is above the threshold, method 200 may return to block 206 where the source hypervisor may execute additional synchronization operations to synchronize the VM memory with the PMEM device.

At block 212, the live migration process may enter a cold migration phase. During the cold migration phase, the source hypervisor may issue a command to stop the VM from executing on the source host. At block 214, the hypervisor may execute a synchronization command to synchronize the remaining portion of the VM memory with the PMEM device. In one embodiment, the synchronization command may be received by the RDMA adapter, which may translate the command to an RDMA flush command, in accordance with embodiments previously described. In one embodiment, the source hypervisor may receive a notification when the synchronization with the PMEM device is complete. When the VM is suspended, the source hypervisor may transmit a minimal execution state of the VM on the source host to the destination host.

At block 216, the source hypervisor may map memory of the VM on the PMEM device on the destination host memory (e.g., memory 135b of FIG. 1). In one embodiment, the source hypervisor may map the VM memory on the PMEM device on the destination host after the source hypervisor has started the VM on the destination host. In some implementations, VM memory may be stored on the PMEM device solely for the purpose of facilitating live migration of the VM between the source host and the destination host. In such an embodiment, the VM memory may be copied to the destination memory space. After the memory copying is complete, the VM memory may be re-mapped from the PMEM device 102 to memory 135b.

At block 218, the destination hypervisor may start the VM on the destination host. In one embodiment, the destination hypervisor may start the VM on the destination host after the destination hypervisor maps the VM memory on the PMEM device on the destination host. In such an embodiment, when an application executing on the VM attempts to access a memory page of VM memory, a page fault may occur and the VM memory on the destination host may be mapped on the PMEM device. In another embodiment, the host controller may instruct the destination hypervisor to start the VM before receiving the notification that synchronization command executed by the source hypervisor is complete. In such an embodiment, the VM, and the application executing on the VM, may be prevented from accessing any memory pages of the destination VM memory until the notification is received that synchronization operation is complete. In another embodiment, the host controller may instruct the destination host to start the VM before the synchronization command is executed by the hypervisor at block 214. In such an embodiment, the VM, and the application executing on the VM, may be prevented from accessing any memory pages of the destination VM memory until the notification is received that synchronization operation is complete.

Figure 3:
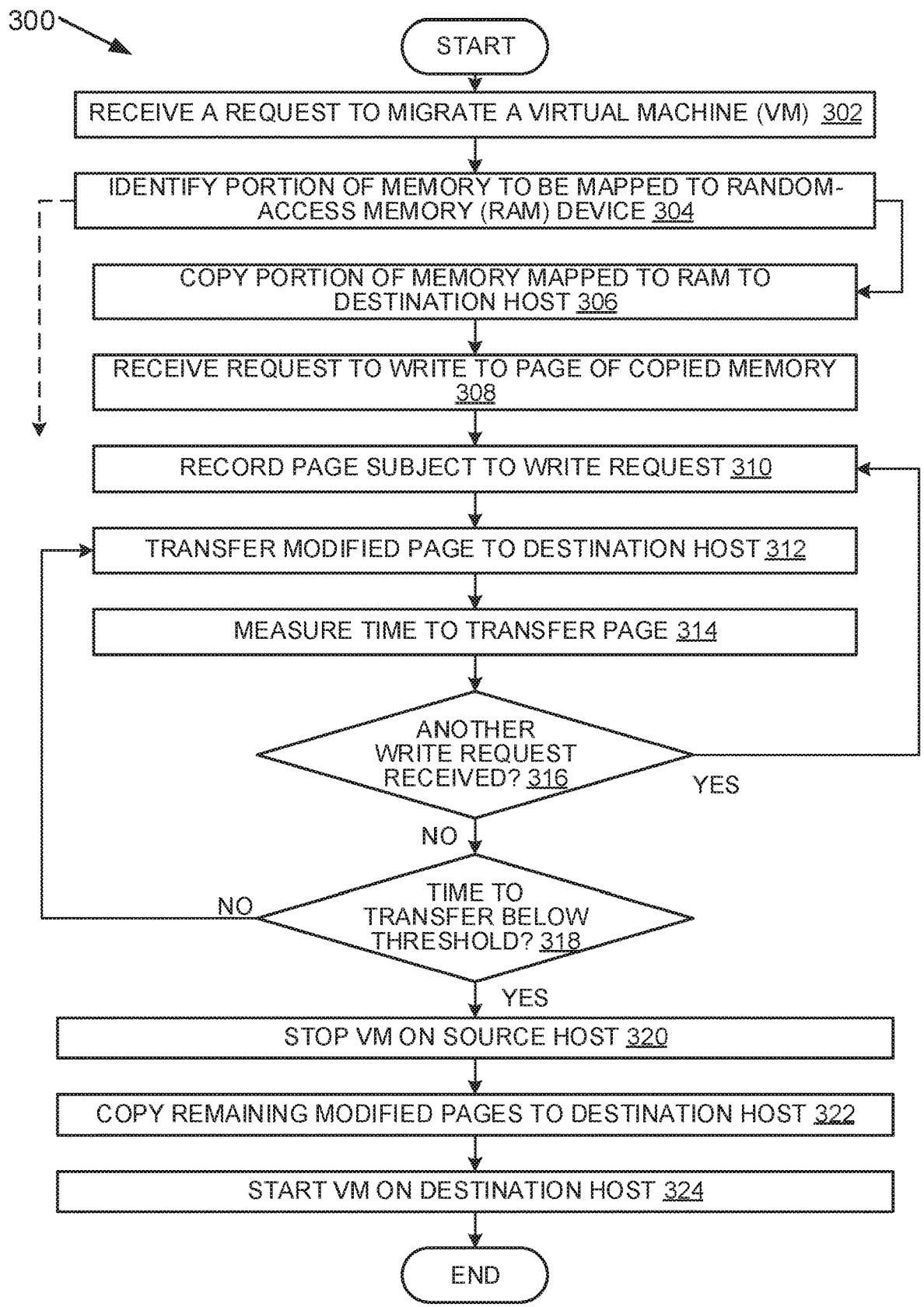
FIG. 3 depicts a flow diagram of another method executed by a host module for live migration of a VM from a source host to a destination host in accordance with one or more aspects of the present disclosure.

FIG. 3 is a flow diagram illustrating one embodiment of a method 300 for live migration of a virtual machine form a source host to a destination host using a PMEM device. In some implementations, not all memory associated with the VM may be mapped to a PMEM device prior to live migration. In such implementations, a first portion of VM memory may be mapped to a PMEM device, while a second portion of memory may be mapped to a RAM storage device located on the source host (e.g., host RAM 112*a* of FIG. 1).

At block 302, a source hypervisor on a source host may initiate live migration responsive to receiving a request to migrate a VM from the source host to a destination host. The request may be received from a host controller that directs VM migrations between host machines. The host controller may issue the request responsive to a triggering event (e.g., a system administrator's migration request, a system condition such as resource utilization of the source host raising above a threshold, etc.).

At block 304, the source hypervisor may identify a first portion of VM memory to be mapped to the PMEM device, and a second portion of VM memory to be mapped to the host RAM. In some implementations, the first and second portions of VM memory may be determined prior to the source hypervisor receiving the migration request. In one embodiment, the processing logic may determine the first and second portions of VM memory. The first and second portions of VM memory may one or more a parameters that are provided to the source hypervisor at the time of creation of the VM. In some embodiments, the first and second portions of VM memory may change dynamically during the execution of the VM.

After the first portion of VM memory is identified, the first portion of VM memory may be mapped to the PMEM device in accordance with embodiments previously described. The second portion of VM memory may similarly be mapped to the host RAM in accordance with embodiments previously described. In one embodiment, the first portion of VM memory and/or the second portion of VM memory may be mapped to the PMEM device and the host RAM, respectively, on VM boot. In another embodiment, the first and second portions of VM memory may be mapped to the PMEM device and the host RAM, respectively, before the request to initiate live migration is received by the source hypervisor. In such an embodiment, responsive to receiving the request to facilitate live migration and identifying the first portion of memory to be mapped to the PMEM device, the source hypervisor may remove the mapping of the first portion of memory to the host RAM and may map the first portion of the VM memory to the PMEM device.

At block 306, the warm-up phase with respect to the first portion of VM memory may be performed after the VM memory is mapped to the PMEM device and the host RAM, in accordance with previously disclosed embodiments. The memory pages of the second portion of VM memory may be copied to the host RAM of the destination host by the source hypervisor. The VM may continue to run while the second portion of memory is being copied from the source host to the destination host. In one embodiment, the source hypervisor may write protect the VM memory of the source host prior to the second portion of memory being copied to the destination host.

At block 308, a request may be received by the source hypervisor from a guest application executing on the VM to write to a page of the second portion of VM memory. In one embodiment, the source hypervisor may have previously write protected (e.g., set a flag in a page table entry corresponding to a memory page to be write-protected) the second portion of VM memory. When the write request is received, an ensuing page fault may cause a VM exit.

At block 310, a memory page identifier for the memory page subject to the write request may be recorded. The source hypervisor may record the memory page identifier to a write request data structure, such as a list or a table. The source hypervisor may record the identifier for the memory page to a write request list which contains additional memory page identifiers of memory pages of the second portion of memory that have also been subject to a write request. The record of the memory page identifier stored to the write request data structure may indicate to the source hypervisor that at least one memory page of the second portion of VM memory has been modified, and therefore, the previously copied memory page is out of date. After recording the memory page identifier to the write request list, the source hypervisor may allow the one or more memory pages be modified in accordance with the write request.

At block 312, a modified memory page may be transferred to the destination host. After the memory pages of the second portion of the VM memory have been copied from the source host to the destination host, the source hypervisor may identify one or more pages from the write request list in the second portion of the VM memory to re-copy to the destination memory. The source hypervisor may re-copy the modified memory pages from the second portion of the VM memory to the memory of the destination host.

At block 314, the amount of time to copy at least one memory page to the destination memory may be measured by the source hypervisor. A memory page copy metric may be computed based on the completion time to copy one or more memory pages of the second portion of VM memory from the source host to the destination host. The source hypervisor may use various techniques to generate the memory page copy metric. In one embodiment, the memory page copy metric may be represented by an average memory page copy time period measured over a predetermined number of consecutively copied memory pages that were copied from the source host to the destination host. In another embodiment, the memory page copy metric may be represented by a maximum memory copy time period measured over a predetermined number of consecutively copied memory pages.

At block 316, it may be determined whether another write request was received while the memory pages identified on the write request list are re-copied to the destination memory. Memory pages that are identified on the write request list may be subject to the subsequent write request. In one embodiment, memory pages that are not identified on the write request list may be subject to the subsequent write request. If it is determined that another write request was received, method 300 may return to block 310 where the memory page subject to the most recent write request is recorded to the write request list. If it is determined that another write request was not received, method 300 may continue to block 318.

At block 318, it may be determined whether the memory page copy metric falls below a predetermined or dynamically adjustable threshold. Upon determining that the memory page copy metric has fallen below the predetermined or dynamically adjustable threshold, the source hypervisor may exit the warm-up phase and enter a cold migration phase at block 320. In some embodiments, the switch-over moment between the warm-up phase and the cold migration phase may be determined by a machine learning model. In one embodiment, the source hypervisor may determine to enter the cold migration phase at block 320 by considering the synchronization completion metric computed during the warm-up phase of the first portion of VM memory, and the memory page copy metric computed during the warm-up phase of the second portion of the VM memory. When the combination of these two metrics is below a threshold, the live migration process may exit the warm-up phases described previously and enter a single cold migration phase.

At block 320, the live migration process may enter the cold migration phase. During the cold migration phase, the source hypervisor may execute a command to stop the VM from running on the source host.

At block 322, the pages remaining on the write request list may be copied to the destination host. The source hypervisor may execute a synchronization command to synchronize the remaining contents of the VM memory on the source host that is mapped with the PMEM device. The source hypervisor and/or a host controller may receive a notification that the memory page copying operation and the synchronization operation are compete. The source hypervisor may also transmit a minimal execution state of the VM to the destination host.

At block 324, the VM may be started on the destination host. A host controller may instruct the destination host to start the VM. The memory stored on the PMEM device may be mapped and/or copied to the destination memory in accordance with previously disclosed embodiments.

Figure 4:
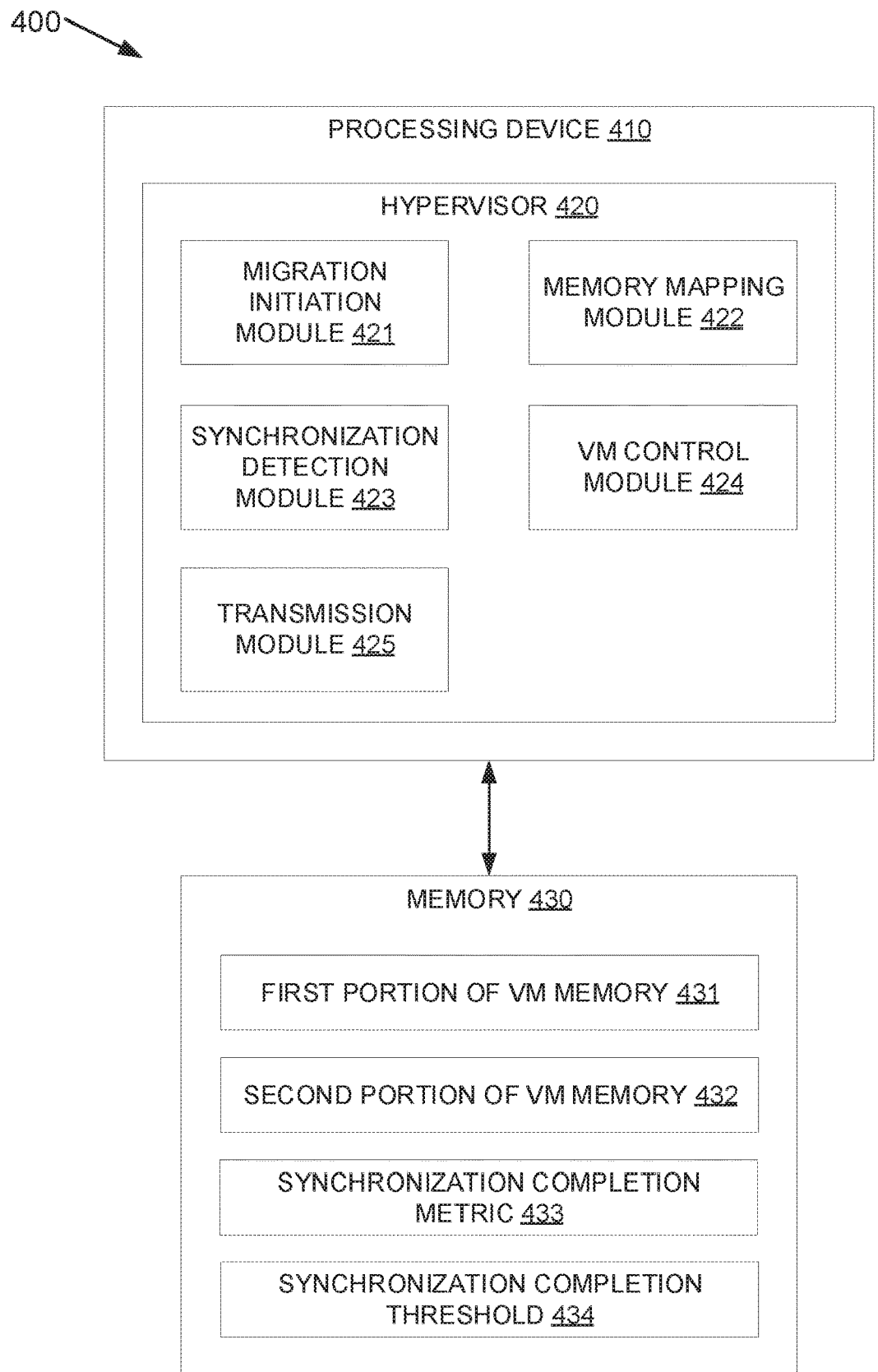
FIG. 4 depicts a block diagram illustrating an example of a hypervisor, in accordance with one or more aspects of the present disclosure.

FIG. 4 illustrates a block diagram example of a hypervisor 420 for facilitating live migration of a VM, in accordance with one or more aspects of the present disclosure. In some implementations, hypervisor 420 may correspond to source hypervisor 115a or destination hypervisor 115b of FIG. 1. As shown in FIG. 2, hypervisor 420 may be a component of a computing apparatus 400 that includes a processing device 410, operatively coupled to memory 430, to execute hypervisor 210. In some implementations, processing device 410 and memory 430 may correspond to processing device 502 and main memory 504, respectively, as described below with respect to FIG. 6.

Hypervisor 420 may include migration initiation module 421, memory mapping module 422, synchronization detection module 423, VM control module 424, and transmission module 425. Alternatively, the functionality of one or more of migration initiation module 421, memory mapping module 422, synchronization detection module 423, VM control module 424, and transmission module 425 may be combined into a single module or divided into multiple sub-modules.

Migration initiation module 421 is responsible for initiating the live migration of a VM from a source host to a destination host. Migration initiation module 421 may initiate live migration responsive to receiving a request to migrate a virtual machine from the source host to the destination host. The request may be received from a host controller (e.g., host controller 125 of FIG. 1) that directs virtual machine migrations between host machines. The host controller may issue the request responsive to a triggering event.

Memory mapping module 422 is responsible for mapping at least some memory pages of the VM memory on the source host to a PMEM device. In one embodiment, memory mapping module 422 may also map at least some memory pages of VM memory on a RAM storage device located on the source host (e.g., host RAM 112a of FIG. 1). Memory mapping module 421 may map first portion of VM memory 431 to the PMEM device. In some embodiments, first portion of VM memory 431 may include all of VM memory. Memory mapping module may similarly map second portion of VM memory 432 to host RAM.

Synchronization detection module 423 is responsible for detecting an amount of time to complete at least of subset of synchronization commands issued by hypervisor 410. Synchronization detection module 423 may compute a synchronization completion metric 433 based on the completion time of one or more synchronization commands executed by hypervisor 410. Synchronization detection module 423 may determine whether synchronization completion metric 433 is below a synchronization completion threshold 434.

VM control module 424 is responsible for stopping the VM from executing on the source host and starting the VM on the destination host. VM control module 424 may stop the VM from executing on the source host responsive to receiving an indication from synchronization detection module 423 that synchronization completion metric 433 is below synchronization completion threshold 434.

Transmission module 425 is responsible for transmitting remaining modified memory pages from the source host to the destination host. Transmission module 425 may also be responsible for transmitting a minimal execution state of the VM on the source host to the destination host. Transmission module 425 may transmit the remaining modified memory pages and/or the minimal execution state of the VM from the source host to the destination host responsive to receiving an indication from VM control module 424 that the VM has stopped executing on the source host.

Figure 5:
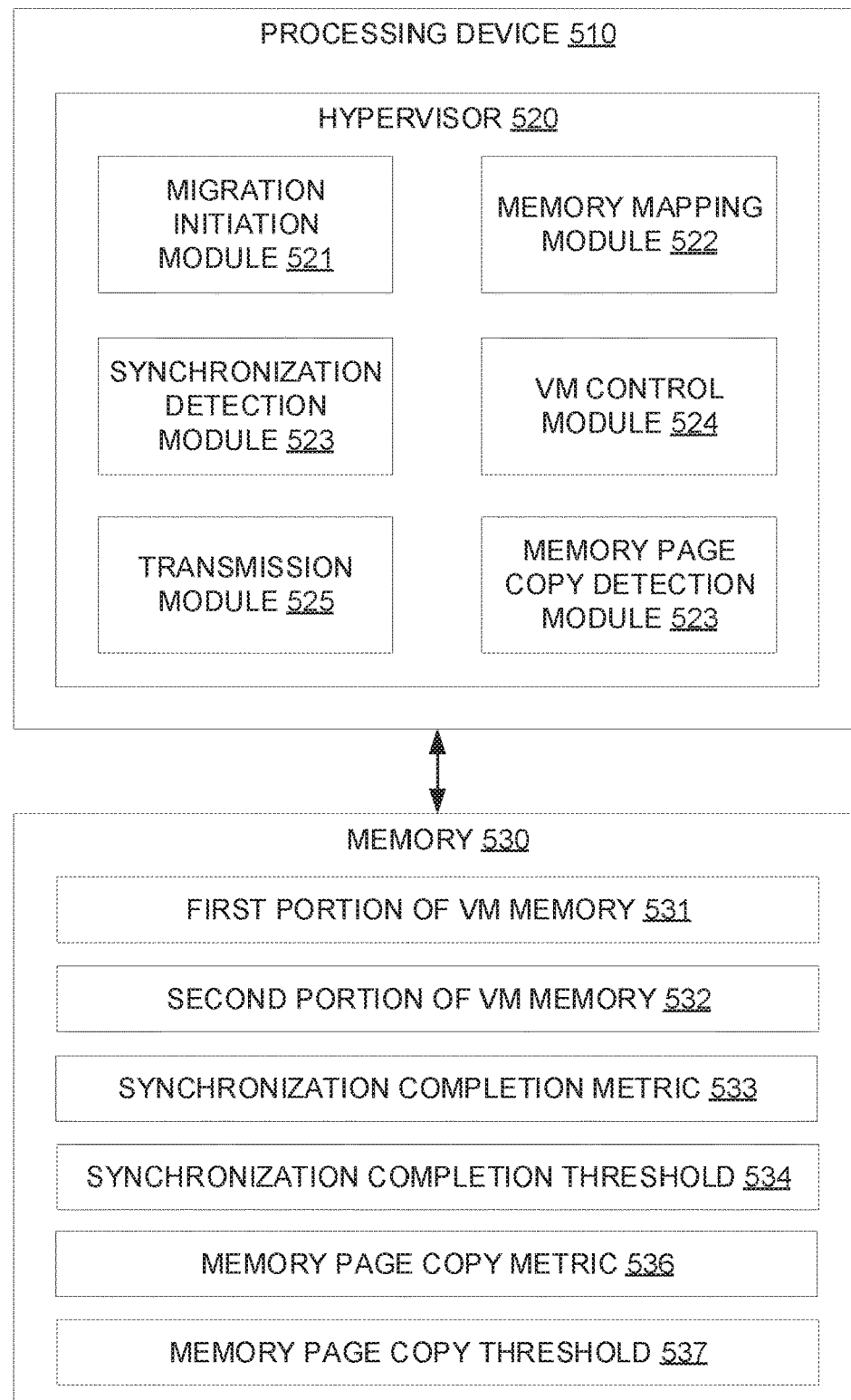
FIG. 5 depicts a block diagram illustrating an example of a hypervisor, in accordance with one or more aspects of the present disclosure.

FIG. 5 illustrates a block diagram example of a hypervisor 520 for facilitating live migration of a VM, in accordance with one or more aspects of the present disclosure. In some implementations, hypervisor 520 may correspond to source hypervisor 115a or destination hypervisor 115b of FIG. 1. As shown in FIG. 2, hypervisor 520 may be a component of a computing apparatus 500 that includes a processing device 510, operatively coupled to memory 530, to execute hypervisor 520. In some implementations, processing device 510 and memory 530 may correspond to processing device 502 and main memory 504, respectively, as described below with respect to FIG. 6.

Hypervisor 520 may include migration initiation module 521, memory mapping module 522, synchronization detection module 523, VM control module 524, transmission module 525, and memory page copy detection module 526. Alternatively, the functionality of one or more of migration initiation module 521, memory mapping module 522, synchronization detection module 523, VM control module 524, transmission module 525, and memory page copy detection module 526 may be combined into a single module or divided into multiple sub-modules.

Migration initiation module 521 may correspond with, and provide functionality similar to, migration module 421 shown in FIG. 4. Memory mapping module 522 is responsible for mapping at least some memory pages of the VM memory on the source host to a PMEM device and at least some pages on a RAM device located on the source host. Memory mapping module 521 may map first portion of VM memory 531 to PMEM device and second portion of VM memory 532 to host RAM.

Synchronization detection module 523 may correspond with, and provide functionality similar to, synchronization detection module 423. Memory page copy detection module 526 is responsible for detecting an amount of time to copy at least one memory page from the source host to the destination host. Memory page copy detection module may compute a memory page copy metric 536 based on an amount of time to copy one or more memory pages included on a write request data structure from the source host to the destination host. Memory page copy detection module 526 may determine whether memory page copy metric 536 is below a memory page copy threshold 537.

VM control module 524 is responsible for stopping the VM from executing on the source host and starting the VM on the destination host. VM control module 524 may stop the VM from executing on the source host responsive to receiving an indication from synchronization detection module 523 that synchronization completion metric 533 is below synchronization completion threshold 534, and/or receiving an indication from memory page copy detection module 526 that memory page copy metric 536 is below memory page copy threshold 537. Transmission module 525 may correspond with, and provide functionality similar to, transmission module 425.

Figure 6:
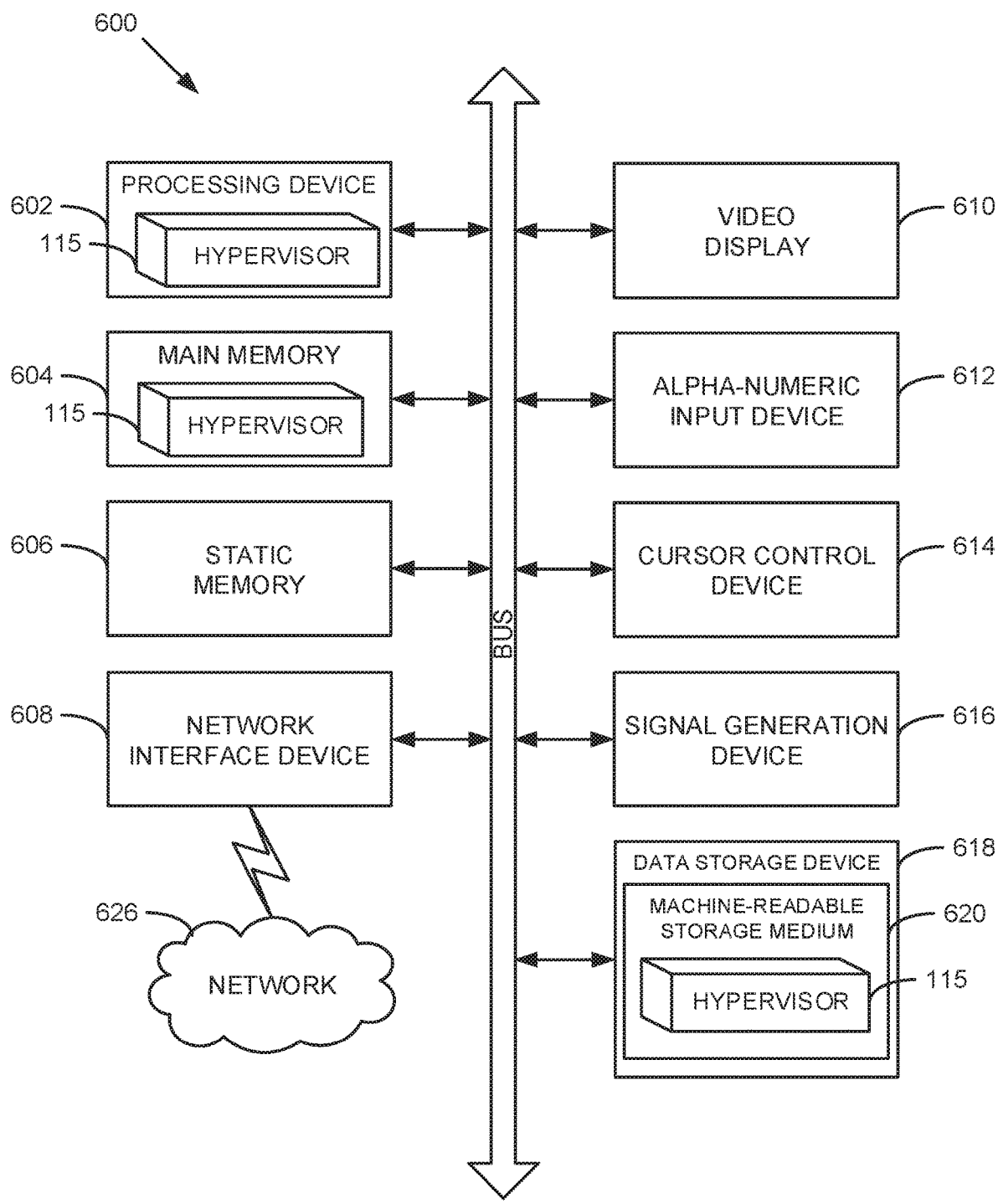
FIG. 6 depicts a block diagram of an illustrative computing device operating in accordance with the examples of the present disclosure.

FIG. 6 illustrates a diagrammatic representation of a machine in the exemplary form of a computer system 600 within which a set of instructions for causing the machine to perform any one or more of the methodologies discussed herein may be executed. In various illustrative examples, computer system 600 may correspond to source host 101*a* and/or destination host 101*b* of FIG. 1. Computer system 600 may be included within a data center that supports virtualization. Virtualization within a data center results in a physical system being virtualized using virtual machines to consolidate the data center infrastructure and increase operational efficiencies. A VM may be a program-based emulation of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain embodiments, computer system 600 may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. Computer system 600 may be provided by a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that device. Further, while only a single machine is illustrated, the term "computer" shall also be taken to include any collection of computers that individually or jointly execute a set (or multiple sets) of instructions to perform any one or more of the methodologies discussed herein.

The example computer system 600 may include a processing device 602, a main memory 604 (e.g., read-only memory (ROM), flash memory, dynamic random access memory (DRAM) (such as synchronous DRAM (SDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets. Processing device 602 may also be one or more special-purpose processing devices such as an application specific integrated circuit (ASIC), a field programmable gate array (FPGA), a digital signal processor (DSP), network processor, or the like. Processing device 602 may be configured to execute hypervisor 115 for programming the operations and steps discussed herein.

Computer system 600 may further include a network interface device 608. Computer system 600 may also include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

Data storage device 618 may include a machine-readable storage medium (or more specifically a computer-readable storage medium) 620 having one or more sets of instructions (e.g., the hypervisor 115) embodying any one or more of the methodologies of functions described herein. The hypervisor 115 may also reside, completely or at least partially, within main memory 604 and/or within processing device 602 during execution thereof by computer system 600; main memory 604 and processing device 602 also constituting machine-readable storage media. Hypervisor 115 may further be transmitted or received over a network 626 via network interface device 608.

Machine-readable storage medium 620 may also be used to store the device queue manner logic persistently. While machine readable storage medium 620 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of methods and symbolic representations of operations on data bits within a computer memory. These descriptions and representations are the means used by those skilled in the data processing arts to most effectively convey the substance of their work to others skilled in the art. A method is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling," "transmitting," "requesting," "identifying," "querying," "retrieving," "forwarding," "determining," "passing," "processing," "issuing," "measuring," "caching," "monitoring," "mapping," "estimating," "calculating," "disabling," "detecting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), erasable programmable ROMs (EPROMs), electrically erasable programmable ROMs (EEPROMs), magnetic or optical cards, flash memory devices including universal serial bus (USB) storage devices (e.g., USB key drives) or any type of media suitable for storing electronic instructions, each of which may be coupled to a computer system bus.

The methods and illustrative examples described herein are not inherently related to any particular computer or other apparatus. Various general purpose systems may be used with programs in accordance with the teachings herein or it may prove convenient to construct more specialized apparatus to perform the required methods 200 and 300, and/or each of their individual functions, routines, subroutines or operations. Examples of the structure for a variety of these systems are set forth in the description above.

It is to be understood that the above description is intended to be illustrative, and not restrictive. Many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

Other computer system designs and configurations may also be suitable to implement the systems and methods described herein. The following examples illustrate various implementations in accordance with one or more aspects of the present disclosure.

Example 1 is a method comprising: receiving a request to migrate a virtual machine from a source host to a destination host; mapping, by a hypervisor running on the source host, a first portion of a memory of the virtual machine on a persistent memory device, where the persistent memory device is accessible by the source host machine and the destination host machine; responsive to determining that a time period to execute a synchronization operation with respect to the first portion of the memory by the persistent memory device is below a threshold, stopping the virtual machine on the source host; and starting the virtual machine on the destination host.

Example 2 is a method of Example 1, wherein determining that the time period to execute the synchronization operation is below the threshold comprises: issuing a synchronization command with respect to the first portion of the memory mapped to the persistent memory device; measuring a completion time period of a synchronization operation initiated responsive to the synchronization command; updating a metric reflecting the completion time period; and determining whether the metric is below the threshold.

Example 3 is the method of Example 2, further comprising: translating the synchronization command to a remote direct memory access (RDMA) flush command.

Example 4 is the method of Example 1, wherein the metric reflects an average completion time period of two or more synchronization operations that were initiated by two or more synchronization commands.

Example 5 is the method of Example 4, wherein starting the virtual machine on the destination host machine further comprises: mapping, by a hypervisor running on the destination host machine, a second portion of the memory of the persistent memory device to a local memory of the destination host machine.

Example 6 is the method of Example 1, further comprising: responsive to receiving the request to migrate the virtual machine from the source host machine to the destination host machine, remapping the first portion of the memory of the virtual machine to the persistent memory device.

Example 7 is the method of Example 1, wherein the persistent memory device is co-located with the source host machine or the destination host machine.

Example 8 is the method of Example 1, wherein the first portion of the memory of the virtual machine and a second portion of the memory of the virtual machine is mapped to a random-access memory (RAM) device.

Example 9 is the method of Example 1, wherein the first portion of the memory of the virtual machine on the source host machine is mapped on the persistent memory device on system boot.

Example 10 is the method of Example 1, further comprising identifying, by a hypervisor running on the source host, a second portion of the memory of the virtual machine to be mapped on a random-access memory (RAM) device.

Example 11 is the method of Example 9, further comprising copying at least one memory page of the part of the memory of the virtual machine that is mapped to the RAM device to a memory on the destination host machine.

Example 12 is the method of Example 11, further comprising: responsive to receiving a request to modify at least one memory page of the part of the memory of the virtual machine, blocking the at least one memory page from being modified, recording an identifier associated with the at least one memory page to a write-request data structure; and allowing the at least one memory page to be modified in accordance with the request.

Example 13 is the method of Example 11, further comprising responsive to determining that a time period to copy at least one memory page of the second portion of the memory of the virtual machine is below a threshold, stopping the virtual machine on the source host.

Example 14 is the method of Example 13, wherein determining that a time period to copy at least one memory page of the part of the memory of the virtual machine not mapped on the persistent memory device is below a threshold comprises: issuing a command to copy the at least one memory page to the memory of the destination host machine; measuring a completion time of the copy command; updating a metric reflecting the completion time period of the copy command; and determining whether the metric is below the threshold.

Example 15 is a system, comprising: a memory; a processing device coupled to the memory, the processing device executing a hypervisor to: receive a request to migrate a virtual machine from a source host machine to a destination host machine; map, by a hypervisor running on the source host machine, a first portion of the memory associated with the virtual machine to a persistent memory device, wherein the persistent memory device is accessible by the source host machine and the destination host machine; responsive to determining that a time period to execute a synchronization operation with respect to the first portion of the memory is below a threshold, stop the virtual machine on the source host machine; and start the virtual machine on the destination host machine.

Example 16 is the method of Example 15, wherein determining that the time period to execute a synchronization operation on the first portion of the memory of the virtual machine mapped on the persistent memory device is below the threshold comprises: issuing a synchronization command with respect to the first portion of the memory to the persistent memory device; measuring a completion time period of a synchronization operation initiated by an execution of the synchronization command; updating a metric reflecting the completion time period; and determining whether the metric is below the threshold.

Example 17 is the method of Example 16, further comprising: translating the synchronization command to a remote direct memory access (RDMA) flush command.

Example 18 is the method of Example 16, wherein the metric corresponds to an average completion time period of two or more synchronization commands that were issued consecutively by the hypervisor.

Example 19 is the method of Example 16, wherein starting the virtual machine on the destination host machine further comprises: mapping, a hypervisor running on the destination host machine, a second portion of the memory of the persistent device to a local memory of the destination host machine.

Example 20 is the method of Example 16, wherein the first portion of the memory of the virtual machine is mapped to a random-access memory (RAM) device located on the source host machine, and further comprising: responsive to receiving the request to migrate the virtual machine from the source host machine to the destination host machine, removing the mapping of the first portion of the memory of the virtual machine from the RAM device; and mapping the first portion of the memory of the virtual machine to the persistent memory device.

Example 21 is the method of Example 16, wherein the persistent memory device is co-located with the source host machine or the destination host machine.

Example 22 is one or more tangible, non-transitory computer readable storage medium including instructions that, when executed by a processing device, cause the processing device to perform a method comprising: receiving a request to migrate a virtual machine from a source host machine to a destination host machine; identifying, by a hypervisor running on the source host machine, a first portion of memory of the virtual machine to be mapped to a persistent memory device and a second portion of memory of the virtual machine to be mapped to a random-access memory (RAM) device located on the source host machine, wherein the persistent memory device is accessible by the source host machine and the destination host machine; mapping, by the hypervisor running on the source host machine, the first portion of the memory of the virtual machine to the persistent memory device and the second portion of the memory of the virtual machine to the RAM device; copying at least one memory page of the second portion of the memory to a memory device of the destination host machine; stopping the virtual machine on the source host machine; and starting the virtual machine on the destination host machine.

Example 23 is the one or more tangible, non-transitory computer readable media storing instructions of Example 22, where in the processing device is further to perform: stopping the virtual machine on the source host machine responsive to determining that a time period to execute a synchronization operation on the first portion of the memory is below a first threshold.

Example 24 is the one or more tangible, non-transitory computer readable media storing instructions of Example 23, further comprising: stopping the virtual machine on the source host responsive to determining that a time period to copy at least one memory page of the second portion of the memory of the virtual machine is below a second threshold.

Example 25 is the one or more tangible, non-transitory computer readable media storing instructions of Example 23, wherein determining that the time period to execute a synchronization operation on the first portion of the memory is below a threshold comprises: issuing a synchronization command with respect to the first portion of the memory to the persistent memory device; measuring a completion time period of a synchronization operation initiated by an execution of the synchronization command; updating a metric reflecting the completion time period; and determining whether the metric is below the threshold.

Example 26 is the one or more tangible, non-transitory computer readable media storing instructions of Example 25, further comprising: translating the synchronization command to a remote direct memory access (RDMA) flush command, wherein measuring the completion time period of the synchronization operation further comprises: measuring a completion time period of a RDMA flush operation initiated by an execution of the RDMA flush command, wherein the completion time period of the synchronization operation comprises the completion time of the RDMA flush operation.

Example 27 is the one or more tangible, non-transitory computer readable media storing instructions of Example 22, wherein the persistent memory device is co-located with the source host machine or the destination host machine.

Example 28 is a system comprising: a physical network interface card; a memory; a processing device coupled to the memory and the physical network interface card, the processing device executing a hypervisor to: receive a request to migrate a virtual machine from a source host machine to a destination host machine; map, by a hypervisor running on the source host machine, a first portion of the memory associated with the virtual machine to a persistent memory device, wherein the persistent memory device is accessible by the source host machine and the destination host machine; responsive to determining that a time period to execute a synchronization operation with respect to the first portion of the memory is below a threshold, stop the virtual machine on the source host machine; and start the virtual machine on the destination host machine.

Example 29 is the system of Example 28, wherein determining that the time period to execute a synchronization operation on the first portion of the memory of the virtual machine mapped on the persistent memory device is below the threshold comprises: issuing a synchronization command with respect to the first portion of the memory to the persistent memory device; measuring a completion time period of a synchronization operation initiated by an execution of the synchronization command; updating a metric reflecting the completion time period; and determining whether the metric is below the threshold.

Example 30 is the system of Example 29, further comprising: translating the synchronization command to a remote direct memory access (RDMA) flush command.

Example 31 is an electronic device, comprising: a memory; a processing device coupled to memory, the processing device executing a hypervisor to: receive a request to migrate a virtual machine from a source host machine to a destination host machine; map, by a hypervisor running on the source host machine, a first portion of the memory associated with the virtual machine to a persistent memory device, wherein the persistent memory device is accessible by the source host machine and the destination host machine; responsive to determining that a time period to execute a synchronization operation with respect to the first portion of the memory is below a threshold, stop the virtual machine on the source host machine; and start the virtual machine on the destination host machine.

Example 32 is the electronic device of Example 31, wherein determining that the time period to execute a synchronization operation on the first portion of the memory of the virtual machine mapped on the persistent memory device is below the threshold comprises: issuing a synchronization command with respect to the first portion of the memory to the persistent memory device; measuring a completion time period of a synchronization operation initiated by an execution of the synchronization command; updating a metric reflecting the completion time period; and determining whether the metric is below the threshold.

Example 33 is the electronic device of Example 32, further comprising: translating the synchronization command to a remote direct memory access (RDMA) flush command.

Example 34 is an apparatus for facilitating live migration of a virtual machine from a source host machine to a destination host machine, comprising means for: receiving a request to migrate a virtual machine from a source host machine to a destination host machine; mapping, by a hypervisor running on the source host machine, a first portion of a memory of the virtual machine to a persistent memory device, wherein the persistent memory device is accessible by the source host machine and the destination host machine; responsive to determining that a time period to execute a synchronization operation with respect to the first portion of the memory by the persistent memory device is below a threshold, stopping the virtual machine on the source host machine; and starting the virtual machine on the destination host machine.

Example 35 is the apparatus of Example 34, wherein determining that the time period to execute the synchronization operation is below the threshold further comprises: issuing a synchronization command with respect to the first portion of the memory mapped to the persistent memory device; measuring a completion time period of a synchronization operation initiated responsive to the synchronization command; updating a metric reflecting the completion time period; and determining whether the metric is below the threshold.

What is claimed is:
1. A method comprising:
receiving a request to migrate a virtual machine (VM) from a source host machine to a destination host machine;
mapping, by a hypervisor running on the source host machine, a first portion of a VM memory residing at a first local memory device of the source host machine to a network-attached persistent memory device and a second portion of the VM memory residing at the first local memory device of the source host machine to a second local memory device of the source host machine, wherein the network-attached persistent memory device is accessible by the source host machine and the destination host machine, and wherein the first portion of the VM memory mapped to the network-attached persistent memory device is larger than the second portion of the VM memory mapped to the second local memory device of the source host machine;
executing, by the hypervisor, one or more synchronization commands, wherein each synchronization command of the one or more synchronization commands initiates a synchronization operation, wherein the synchronization operation involves executing a remote direct memory access (RDMA) flush command to flush contents of the first portion of the VM memory to the network-attached persistent memory device;
copying memory pages of the second portion of the VM memory from the second local memory device of the source host machine to the destination host machine;
calculating a synchronization completion metric reflecting an average completion time period of the synchronization operation following an execution of the RDMA flush command to flush contents of the first portion of the VM memory, the completion time period measured over completion times of the one or more synchronization commands;
calculating a memory page copy metric reflecting a completion time to copy one or more memory pages of the second portion of the VM memory to the destination host machine; and
responsive to determining, in view of the calculated synchronization completion metric and the memory page copy metric, that a time period to complete the synchronization operation for the first portion of the

VM memory and the copying of the memory pages of the second portion of the VM memory is below a threshold:
  stopping the VM on the source host machine; and
  starting the VM on the destination host machine.

2. The method of claim 1, wherein calculating the synchronization completion metric comprises:
  responsive to executing the one or more synchronization commands, measuring a completion time period of a synchronization operation initiated responsive to the execution of the one or more synchronization commands; and
  updating the synchronization completion metric reflecting the completion time period.

3. The method of claim 2, further comprising:
  translating at least one of the one or more synchronization commands to the RDMA flush command.

4. The method of claim 1, wherein starting the VM on the destination host machine further comprises:
  mapping, by a hypervisor running on the destination host machine, a second portion of the VM memory at the persistent memory device to a local random access memory (RAM) device of the destination host machine.

5. The method of claim 1, further comprising:
  responsive to receiving the request to migrate the VM from the source host machine to the destination host machine, re-mapping the first portion of the VM memory to the persistent memory device.

6. The method of claim 1, wherein the first portion of the VM memory and a second portion of the VM memory is mapped to the second local memory device.

7. The method of claim 1, further comprising:
  responsive to determining, in view of the calculated synchronization completion metric, that the time period to complete the synchronization operation exceeds the threshold, executing one or more additional synchronization commands.

8. A system comprising:
  a memory; and
  a processing device coupled to memory, to:
    receive a request to migrate a virtual machine from a source host machine to a destination host machine;
    map, by a hypervisor running on the source host machine, a first portion of virtual machine (VM) memory residing at a first memory device of the source host machine to a network-attached persistent memory device and a second portion of the VM memory residing at the first memory device of the source host machine to a second local memory device of the source host machine, wherein the network-attached persistent memory device is accessible by the source host machine and the destination host machine, and wherein the first portion of the VM memory mapped to the network-attached persistent memory device is larger than the second portion of the VM memory mapped to the second local memory device of the source host machine;
    execute, by the hypervisor, one or more synchronization commands, wherein each of the one or more synchronization commands initiates a synchronization operation, wherein the synchronization operation involves executing a remote direct memory access (RDMA) flush command to flush contents of the first portion of the VM memory to the network-attached persistent memory device;
    copy memory pages of the second portion of the VM memory from the second local memory device of the source host machine to the destination host machine;
    calculate a synchronization completion metric reflecting a maximum completion time period of the synchronization operation following an execution of the RDMA flush command to flush contents of the first portion of the VM memory, the completion time period measured over completion times of the one or more synchronization commands;
    calculate a memory page copy metric reflecting a completion time to copy one or more memory pages of the second portion of the VM memory to the destination host machine; and
    responsive to determining, in view of the calculated synchronization completion metric and the memory page copy metric, that a time period to complete the synchronization operation for the first portion of the VM memory and the copying of the memory pages of the second portion of the VM memory is below a threshold:
      stop the virtual machine on the source host machine; and
      start the virtual machine on the destination host machine.

9. The system of claim 8, wherein to calculate the synchronization completion metric, the processing device is to:
  responsive to executing the one or more synchronization commands, measuring a completion time period of a synchronization operation initiated responsive to execution of the one or more synchronization commands; and
  updating the synchronization completion metric reflecting the completion time period.

10. The system of claim 9, wherein the processing device is further to:
  translate at least one of the one or more synchronization commands to the RDMA flush command.

11. The system of claim 8, wherein to start the virtual machine on the destination host machine, the processing device is to:
  map, by a hypervisor running on the destination host machine, a second portion of the VM memory at the persistent memory device to a local random access memory (RAM) device of the destination host machine.

12. The system of claim 8, wherein the first portion of the VM memory of the virtual machine is mapped to a random-access memory (RAM) device located on the source host machine, and wherein the processing device is further to:
  responsive to receiving the request to migrate the VM from the source host machine to the destination host machine, remove the mapping of the first portion of the VM memory from the RAM device; and
  map the first portion of the VM memory to the persistent memory device.

13. The system of claim 8, wherein the processing device is further to:
  responsive to determining, in view of the calculated synchronization completion metric, that the time period to complete the synchronization operation exceeds the threshold, execute one or more additional synchronization commands.

14. A non-transitory computer readable storage medium including instructions that, when executed by a processing device, cause the processing device to perform operations comprising:

receiving a request to migrate a VM from a source host machine to a destination host machine;

identifying, by a hypervisor running on the source host machine, a first portion of VM memory to be mapped to a network-attached persistent memory device and a second portion of VM memory to be mapped to a local random-access memory (RAM) device located on the source host machine, wherein the network-attached persistent memory device is accessible by the source host machine and the destination host machine;

mapping, by the hypervisor running on the source host machine, the first portion of the VM memory residing at the memory of the source host machine to the network-attached persistent memory device and the second portion of the VM memory residing at the memory of the source host machine to the local RAM device, wherein the first portion of the VM memory mapped to the network-attached persistent memory device is larger than the second portion of the VM memory mapped to the RAM device located on the source host machine;

copying at least one memory page of the second portion of the VM memory to a local RAM device of the destination host machine;

calculating a synchronization completion metric based on an execution of one or more synchronization commands, wherein the one or more synchronization commands correspond to one or more remote direct memory access (RDMA) flush commands to flush contents of the first portion of the VM memory to the network-attached memory device, and wherein the synchronization completion metric reflects an average completion time period measured over completion times of a particular number of synchronization operations following the execution of the one or more synchronization commands; and calculating a memory page copy metric reflecting a completion time to copy one or more memory pages of the second portion of the VM memory to the destination host machine;

determining, in view of the calculated synchronization completion metric and the memory page copy metric, that a time period to complete the synchronization operation for the first portion of VM memory and the copying of the memory pages of the second portion of VM memory is below a threshold;

stopping the VM on the source host machine; and starting the VM on the destination host machine.

15. The non-transitory computer readable storage medium of claim 14, wherein the processing device is to stop the VM on the source host responsive to determining that a time period to copy at least one memory page of the second portion of the VM memory to the local memory of the destination host machine is below another threshold.

16. The non-transitory computer readable storage medium of claim 14, wherein calculating the synchronization completion metric comprises:

responsive to executing the one or more synchronization commands, measuring a completion time period of a synchronization operation initiated responsive to the execution of the one or more synchronization commands; and updating the synchronization completion metric reflecting the completion time period.

17. The non-transitory computer readable storage medium of claim 16, further comprising:

translating at least one of the one or more synchronization commands to a corresponding RDMA flush command.

* * * * *